US010023726B2

(12) United States Patent
Schultz et al.

(10) Patent No.: US 10,023,726 B2
(45) Date of Patent: *Jul. 17, 2018

(54) NANOCALCITE AND VINYL ESTER COMPOSITES

(75) Inventors: William J. Schultz, North Oaks, MN (US); Peter D. Condo, Lake Elmo, MN (US); Emily S. Goenner, Shoreview, MN (US); Chad A. Haraldson, Apple Valley, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/502,891

(22) PCT Filed: Dec. 13, 2010

(86) PCT No.: PCT/US2010/060082
§ 371 (c)(1),
(2), (4) Date: Apr. 19, 2012

(87) PCT Pub. No.: WO2011/084380
PCT Pub. Date: Jul. 14, 2011

(65) Prior Publication Data
US 2012/0244338 A1  Sep. 27, 2012

(51) Int. Cl.
C08K 9/08 (2006.01)
C08K 3/26 (2006.01)
C08L 67/06 (2006.01)
C08L 67/07 (2006.01)

(52) U.S. Cl.
CPC ............... C08K 9/08 (2013.01); C08K 3/26 (2013.01); C08K 2201/011 (2013.01); C08L 67/06 (2013.01); C08L 67/07 (2013.01); Y10T 428/25 (2015.01)

(58) Field of Classification Search
CPC ........ C08G 59/00; C08G 59/02; B82Y 30/00; B82Y 40/00; B01F 3/18; B01F 3/12; B82B 3/00
USPC .......................... 428/323; 524/425; 525/242
See application file for complete search history.

(56) References Cited

U.S. PATENT DOCUMENTS

| 4,447,564 | A | 5/1984 | Grimmer |
| 4,478,963 | A | 10/1984 | McGarry |
| 4,624,971 | A | 11/1986 | van Tao et al. |
| 5,648,407 | A * | 7/1997 | Goetz et al. .................. 523/213 |
| 5,694,701 | A | 12/1997 | Huelsmann et al. |
| 5,980,697 | A | 11/1999 | Kolb et al. |
| 6,342,100 | B1 | 1/2002 | Nover |
| 7,596,986 | B2 | 10/2009 | Daniels et al. |
| 7,709,090 | B2 * | 5/2010 | Nover et al. .................. 428/403 |
| 2001/0040007 | A1 | 11/2001 | Hartman et al. |
| 2002/0156152 | A1 | 10/2002 | Zhang et al. |
| 2003/0032693 | A1 | 2/2003 | Angeletakis et al. |
| 2003/0055207 | A1 | 3/2003 | Xu et al. |
| 2004/0076574 | A1 | 4/2004 | Xu et al. |
| 2004/0092639 | A1 * | 5/2004 | Kasahara et al. ............. 524/425 |
| 2006/0076574 | A1 | 4/2006 | Wu |
| 2007/0199477 | A1 | 8/2007 | Hill et al. |
| 2008/0075963 | A1 | 3/2008 | Dershem |
| 2008/0227901 | A1 | 9/2008 | Lefevre et al. |
| 2009/0137706 | A1 | 5/2009 | Healy et al. |
| 2010/0273920 | A1 * | 10/2010 | Bernard et al. ............... 524/114 |

FOREIGN PATENT DOCUMENTS

| EP | 1 426 390 | 6/2004 |
| EP | 2 036 944 | 3/2009 |
| FR | 2923834 A1 * | 5/2009 |
| JP | 59138267 A * | 8/1984 |
| JP | 62-135528 | 6/1987 |
| JP | 06-107937 | 4/1994 |
| JP | 10-330645 | 12/1998 |
| JP | 2002003726 A * | 1/2002 |
| JP | 2002-519468 | 7/2002 |
| JP | 2006 188552 | 7/2006 |
| JP | 2006188552 A * | 7/2006 |
| JP | 2007-169485 | 7/2007 |
| JP | 2008-168913 | 7/2008 |
| JP | 2009-280772 | 12/2009 |
| WO | WO 9837122 A1 * | 8/1998 | ........... C08G 65/239 |
| WO | WO 00/49081 | 8/2000 |
| WO | WO 2003/057740 | 7/2003 |
| WO | WO 2010/080459 | 4/2004 |
| WO | WO 2005071003 A1 * | 8/2005 |

(Continued)

OTHER PUBLICATIONS

STN Registry CAS No. 471-34-1 (1983).*
PCT International Search Report from Application No. PCT/US2010/060082 dated Jun. 7, 2011, 4 pages.
Avella et al., "Novel PMMA/CaCO$_3$ Nanocomposites Abrasion Resistant Prepared by an in Situ Polymerization Process," *Nano Letters*, vol. 1, No. 4, pp. 213-217, (2001).
ASTM Designation: D 5045-99, "Standard Test Methods for Plane-Strain Fracture Toughness and Strain Energy Release Rate of Plastic Materials," (2007) 9 pages.
ASTM Designation: D 2583-07, "Standard Test Method for Indentation Hardness of Rigid Plastics by Means of a Barcol Impressor," (2001) 4 pages.

(Continued)

*Primary Examiner* — Randy P Gulakowski
*Assistant Examiner* — Ha S Nguyen
(74) *Attorney, Agent, or Firm* — Philip P. Soo

(57) ABSTRACT

Compositions comprising surface-modified nanocalcite particles dispersed in a curable resin system comprising a vinyl ester, and coatings and fibrous composites incorporating such compositions are described. The surface-modifying agents include a binding group ionically associated with the calcite and a compatiblizing segment, compatible with the curable resin. The surface-modifying agent may also include a reactive group capable of reacting with the curable resin system. Methods of preparing nanocalcite composites and coating a fibrous composites prepared from such nanocalcite composites are also described.

20 Claims, No Drawings

(56) References Cited

FOREIGN PATENT DOCUMENTS

| WO | WO 2007/014878 | | 2/2007 |
|---|---|---|---|
| WO | WO 2007/108217 | | 9/2007 |
| WO | WO 2008/027979 | | 3/2008 |
| WO | WO 2008/079631 | | 7/2008 |
| WO | WO 2008116932 A1 * | 10/2008 |
| WO | WO 2011/050121 | | 4/2011 |

OTHER PUBLICATIONS

Handbook of Thermoset Plastics, Second Edition, Sidney H. Goodman, Ed. (1998) p. 122.
Jin et al., "Interfacial toughness properties of trifunctional epoxy resins/calcium carbonate nanocomposites," *Materials Science and Engineering A*, 475, pp. 190-193, (2008).
Kresse et al., "Ab initio molecular-dynamics simulation of the liquid metal-amorphous-semiconductor transition in germanium," *Physical Review B*, vol. 49, No. 20, pp. 14251-14271, (May 15, 1994).
Kresse et al., "Ab initio molecular-dynamics for liquid metals," *Physical Review B*, vol. 47, No. 1, pp. 558-561, (Jan. 1, 1993).
Kresse et al., "Efficiency of ab-initio total energy calculations for metals and semiconductors using a plante-wave basis set," *Computational Materials Science* 6, pp. 15-50, (1996).
Kresse et al., "Efficient iterative schemes for ab initio total-energy calculations using a plane-wave basis set" *Physical Review B*, vol. 54, No. 16, pp. 11169-11186, (Oct. 15, 1996).
Lu et al., Polymer/calcium carbonate nanocomposites, *Polymer Nanocomposites*, CRC Press, pp. 412-439, (2006).
Melo et al., "High Energy Mill Processing of Polymer Based Nanocomposites", Journal of Composite Materials, 2363, (2008).
Perdew et al., "Generalized Gradient Approximation Made Simple," *Physical Review Letters*, vol. 77, No. 18, pp. 3865-3868, (Oct. 28, 1996).
Van Krevelen, *Properties of Polymers: Their Correlation with Chemical Structure; Their Numerical Estimation and Prediction from Additive Group Contributions*, third edition, Elsevier Science Publishers B.V., Chapter 7, "Cohesive Properties and Solubility," pp. 189-225, (1990).
Wang et al., "Nano-$CaCO_3$/polypropylene composites made with ultra-high-speed mixer," *Journal of Materials Science Letters 21*, pp. 985-986, (2002).
Yu et al., "Novel Uncured Epoxy Resin/$CaCO_3$ Nanocomposites," *Polymer-Plastics Technology and Engineering*, 45: pp. 809-813, (2006).
Yu et al., "Preparation of Exoxy Resin $CaCo_3$ Nancomposites and Performance of Resultant Powder Coatings," *Journal of Applied Polymer Science*, vol. 101, pp. 2656-2660, (2006).
Yu et al., "Study on nano-$CaCO_3$ modified epoxy powder coatings," *Progress in Organic Coatings*, 55, pp. 296-300, (2006).
Zhang et al., "Preparation and characterization of polystyrene/butyl acrylate/ nano-$CaCO_3$ composites," *Journal of Beijing University Chemical Technology*, 32, pp. 1-4, (2005), English Abstract.

* cited by examiner

NANOCALCITE AND VINYL ESTER COMPOSITES

CROSS REFERENCE TO RELATED APPLICATIONS

This application is a national stage filing under 35 U.S.C. 371 of PCT/US2010/060082, filed Dec. 13, 2010, which claims priority to U.S. Provisional Application No. 61/287,531, filed Dec. 17, 2009, the disclosures of which are incorporated by reference in their entirety herein.

FIELD

The present disclosure relates to compositions comprising surface-modified nanocalcite particles dispersed in a curable vinyl ester resin, and to coatings and fibrous composites incorporating such compositions. Methods of preparing nanocalcite composites in a vinyl ester resin are also described.

BACKGROUND

Nanoparticle-containing resins have been used as coatings and as the impregnating resin of fibrous composites. Generally, the addition of nanoparticles provides improved strength-to-weight ratios compared to the pure resins. These materials have been used in a wide variety of applications including coatings for vehicles (e.g., marine gel coats) and wind turbine blades, and composite structures used in e.g., sporting goods, wind turbine blades, and vehicle fabrication.

SUMMARY

Briefly, in one aspect, the present disclosure provides a composition comprising surface-modified nanoparticles dispersed in a curable resin system comprising a vinyl ester resin. The surface-modified nanoparticles comprise a calcite core, and the surface-modified nanoparticles comprise a first surface-modifying agent comprising a compatiblizing group and a binding group ionically associated with the calcite. In some embodiments, the difference between the solubility parameter of the curable resin and the solubility parameter of the compatiblizing group, as determined according to the Solubility Parameter Procedure, is no more than 4 $J^{1/2}$ $cm^{-3/2}$. In some embodiments, the binding group has a binding energy of at least 0.50 electron volts to calcite as calculated using the Binding Energy Calculation Procedure assuming a calcite rich surface. In some embodiments, at least 90%, of the calcite cores have an average size of less than 400 nm as measured by the Calcite Particle Size Procedure. In some embodiments, the curable resin system further comprises a reactive diluent.

In some embodiments, the binding group comprises a phosphonic acid, a sulfonic acid, a phosphoric acid, or a combination thereof. In some embodiments, the binding group comprises a carboxylic acid. In some embodiments, the compatiblizing group comprises at least one of a polyethylene oxide, a polypropylene oxide, and a polyester. In some embodiments, the compatiblizing group comprises a polyetheramine.

In some embodiments, the first surface-modifying agent is a zwitterion. In some embodiments, the first surface-modifying agent further comprises a reactive group capable of reacting with at least one of the vinyl ester resin and the reactive diluent.

In some embodiments, the composition further comprises a second surface-modifying agent bonded to the calcite, wherein the second surface-modifying agent comprises a binding group and a reactive group capable of reacting with at least one of the vinyl ester resin and the reactive diluent, if present. In some embodiments, the composition comprises at least 10 wt. % nanoparticles based on the total weight of the nanoparticles and the curable resin system. In some embodiments, the composition comprises no greater than 2 wt. %, solvent.

In another aspect, the present disclosure provides a cured composition comprising a composition of the present disclosure, wherein the vinyl ester resin is cured. In some embodiments, the first surface-modifying agent is reacted with at least one of the vinyl ester resin and the reactive diluent, if present. In some embodiments, the cured composition is bonded to at least a portion of the substrate.

In yet another aspect, the present disclosure provides a fibrous composite comprising reinforcing fibers impregnated with a composition of the present disclosure. In some embodiments, at least 90%, of the calcite cores have an average size of less than 400 nm as measured by the Calcite Particle Size Procedure. In some embodiments, the vinyl ester resin is cured.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Generally, the compositions of the present disclosure comprise surface-modified nanoparticles dispersed in a curable resin system comprising a vinyl ester resin. As used herein, "resin system" refers to the major reactive elements that react or co-react to form the final cured resin. The resin systems of the present disclosure comprise at least one curable vinyl ester resin, one or more additional crosslinkable resins, and/or one or more reactive diluents.

As used herein, the term "vinyl ester" refers to the reaction product of epoxy resins with ethylenically-unsaturated monocarboxylic acids. Exemplary epoxy resins include bisphenol A digycidal ether (e.g., EPON 828, available from Hexion Specialty Chemicals, Columbus, Ohio). Exemplary monocarboxylic acids include acrylic acid and methacrylic acid. Although such reaction products are acrylic or methacrylic esters, the term "vinyl ester" is used consistently in, e.g., the gel coat industry. (See, e.g., Handbook of Thermoset Plastics (Second Edition), William Andrew Publishing, page 122 (1998).) Commercially available vinyl ester resins include those available under the trade names HETRON, DERAKANE, and DERAKANE MOMENTUM epoxy vinyl esters from Ashland, Inc., Covington Ky.

Generally, the vinyl ester resin is both soluble in the reactive diluent of the resin system and reacts with the reactive diluent to form a copolymerized network. Generally, any known reactive diluent may be used. Exemplary reactive diluents include styrene, alpha-methylstyrene, vinyl toluene, divinylbenzene, methyl methacrylate, diallyl phthalate, ethylene glycol dimethacrylate, hydroxyethyl methacrylate, hydroxyethyl acrylate and triallyl cyanurate.

The surface-modified nanoparticles of the present disclosure comprise calcite cores and a surface-modifying agent bonded to the calcite. Calcite is the crystalline form of calcium carbonate (i.e., calcite and its polymorphs aragonite and vaterite). Calcium carbonate typically forms well-faceted, columnar or plate-like rhombohedral crystals. However, in some cases, calcium carbonate can form highly anisotropic, irregularly-shaped crystals.

In some embodiments, for example when using the nanocalcite containing resins to produce fibrous composites, it may be desirable to control, e.g., minimize or even eliminate, filtering of the nanocalcite by the fibers. Larger particles or particle aggregates may be filtered or separated from the resin while the mixture is pressured through a highly compressed fiber array in the process of making a continuous fiber composite. This can result in a non-uniform distribution of particles and resin throughout the final composite resulting in decreased physical properties. In some embodiments, at least 70%, e.g., at least 75% of the calcite cores have an average size of less than 400 nm. In some embodiments, at least 90%, in some embodiments, at least 95%, or even at least 98% of the calcite cores have an average size of less than 400 nm.

Generally, the surface-modifying agents of the present disclosure include at least a binding group and a compatiblizing segment:

Comp. Seg.—Binding Group;

wherein "Comp. Seg." refers to the compatiblizing segment.

The compatiblizing segment is selected to improve the compatibility of the calcite nanoparticles with the curable resin and ultimately to improve the dispersion of these nanoparticles in the resin. Generally, the selection of the compatiblizing group depends on a number of factors including the nature of the curable resin, the concentration of the nanoparticles, and the desired degree of compatibility. For vinyl ester resin systems, useful compatiblizing agents include polyalkylene oxides, e.g., polypropylene oxides, polyethylene oxides, and combinations thereof. Other useful compatiblizing segments include polyesters and polyether amines.

In some embodiments, the compatiblizing segment may be selected to provide a positive enthalpy of mixing for the composition containing the surface-modified nanoparticles and the curable resin. If the enthalpy of mixing is positive, the dispersion of nanoparticles in the resin is typically stable. To ensure a positive enthalpy of mixing, the solubility parameter of the compatiblizing segment can be matched to the solubility parameter of the curable resin. In some embodiments, the materials can be selected such that the difference in these solubility parameters is no more than 4 $J^{1/2}$ $cm^{-3/2}$ and, in some embodiments, no more than 2 $J^{1/2}$ $cm^{-3/2}$ as determined according to *Properties of Polymers; Their Correlation with Chemical Structure; Their Numerical Estimation and Prediction from Additive Group Contributions*, third edition, edited by D. W. Van Krevelen, Elsevier Science Publishers B.V., Chapter 7, 189-225 (1990), i.e., "the Solubility Parameter Procedure.".

There are several methods known to determine the solubility parameter of a material such as a compatiblizing segment or a resin. For example, the solubility parameter of the material can be determined from measurements of the extent of equilibrium swelling of the material in a range of solvents of differing solubility parameters. The solubility parameters of the solvents themselves can be determined from their heats of evaporation. The solubility parameter delta ($\delta$) is related to the cohesive energy $E_{coh}$ and the specific volume V by the relationship $\delta=(E_{coh}/V)^{1/2}$. For solvents of low molecular weight, the cohesive energy is closely related to the molar heat of evaporation $\Delta H_{vap}$ according to $E_{coh}=\Delta H_{vap}-p\Delta V=\Delta H_{vap}-RT$. Thus, $E_{coh}$ and $\delta$ can be calculated from the heat of evaporation of the solvent or from the course of the vapor pressure as a function of temperature. To determine the solubility parameter of the material, a plot of equilibrium swelling of the material versus the solubility parameter of the solvents is generated. The solubility parameter of the material is defined as the point on this plot where maximum swelling is obtained. Swelling will be less for solvents having solubility parameters that are less than or greater than that of the material. Alternatively, there are several known methods for theoretically estimating the solubility parameter of a material based on the additive contributions of functional groups.

The binding group bonds to the calcite, connecting the surface-modifying agent to the calcite core. Unlike many silica-based nanoparticle systems wherein the surface-modifying agents are covalently bonded to the silica, the surface-modifying agents of the present disclosure are ionically bonded to (e.g., associated with) the calcite.

In order to retain the surface-modifying agents with the calcite cores during processing of the compositions, it may be desirable to select binding groups having high binding energies to calcite. Binding energies can be predicted using density functional theory calculations. In some embodiments, the calculated binding energies may be at least 0.5, e.g., at least 0.6, or even at least 0.7 electron volts. Generally, the greater the binding energy the greater the likelihood that the binding group will remain ionically associated with the particle surface. In some embodiments, binding energies of at least 0.8, e.g., at least 0.9, or even at least 0.95 electron volts, may be useful.

In some embodiments, the binding group comprises a phosphonic acid, e.g., surface-functionalizing agents having a formula:

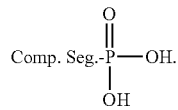

In some embodiments, the binding group comprises a sulfonic acid, e.g., surface-functionalizing agents having a formula:

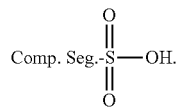

In some embodiments, the surface-modifying agent also comprises a reactive group, e.g., a group capable of reacting with the curable resin, e.g., during the curing process. This can result in the nanocalcite particle being strongly bonded into the resin matrix and may lead to an improvement in the physical properties of the resulting cured nanocomposite. Generally, the reactive group is selected based on the nature of the curable resin. In some embodiments, the reactive group may be located on the end of the compatiblizing segment:

Rx. Group—Comp. Seg.—Binding Group;

wherein "Rx. Group" is the reactive group. In some embodiments, the reactive group may be located along the backbone of, or pendant to, the backbone of the compatiblizing segment. In some embodiments, the reactive group may be located between the compatiblizing segment and the binding group:

Comp. Seg.—Rx. Group—Binding Group.

In some embodiments, a linking group is present connecting the compatiblizing segment with the binding group:

Comp. Seg.—Linking Group—Binding Group.

For example, in some embodiments, the surface-modifying agent comprises a polyetheramine. Exemplary polyetheramines include those available under the trade name JEFFAMINE® available from Huntsman Corporation, The Woodlands, Tex. The polyether serves as a compatiblizing segment, while the amine is the linking group linking the compatiblizing segment with the binding group, e.g., a sulfonic, phosphonic, or carboxylic acid binding group.

In some embodiments, the surface-modifying agent comprises a zwitterion, i.e., a compound carrying a net charge of zero, but which is capable of carrying a formal positive and negative charge on different atoms. In some embodiments, the formal negative charge is carried by the binding group. In some embodiments, the formal positive charge is carried on the nitrogen atom of an amine, e.g., an amine linking group. In such embodiments, the amine may serve as both the linking group and the reactive group.

Generally, the compositions of the present disclosure comprise at least 10 wt. %, in some embodiments, at least 20 wt. %, e.g., at least 30 wt. %, at least 40 wt. %, or even at least 50 wt. % of the surface modified nanoparticles based on the total weight of the nanoparticles and the curable resin system. In some embodiments, it may be useful to have a low viscosity composition, e.g., when the composition is to be sprayed (e.g., when applying a coating), or must flow through fibers (e.g., when making fibrous composites).

Viscosity can be reduced by diluting the composition in solvents, e.g., water, organic solvents, or a combination thereof. If solvents are used, the solvent or combination of solvents can be readily selected such that the resins are soluble. While useful in some applications, the inclusion of solvents tends to increase costs, handling requirements, and process steps. In some embodiments, the compositions of the present disclosure comprise no greater than 5 wt. %, optionally no greater than 2 wt. %, no greater than 1 wt. %, or even no greater than 0.5 wt. % solvent. In some embodiments, certain steps, e.g., milling of the nanoparticles or dispersion of the nanoparticles in the curable resin system, may occur in the presence of a solvent. The solvent can then be removed by, e.g., drying, to reduce the residual solvent in the curable composition to the desired level.

In some embodiments, the compositions of the present disclosure may include additional additives such as curing agents, cure accelerators, catalysts, crosslinking agents, dyes, pigments, flame retardants, impact modifiers, and flow control agents. In some embodiments, the compositions may include tougheners, e.g., rubber tougheners. Exemplary rubber tougheners include coreshell rubbers. In some embodiments, nano-sized coreshell rubber tougheners may be used, i.e., coreshell rubber tougheners having an average size of less than 1 micron. In some embodiments, the nano-sized coreshell rubber tougheners have an average size of less than 500 nm, less than 250 nm, or even less than 100 nm. In some embodiments, micron-sized coreshell rubber tougheners may be used, i.e., coreshell rubber tougheners having an average size of greater than 1 micron, e.g., 1 to 10 microns.

The compositions of the present disclosure may be cured. In some embodiments, the curable resin is crosslinked. Any known crosslinking method may be used including exposure to thermal energy or actinic radiation (e.g., ultraviolet light and electron beam radiation). In some embodiments, the curable resin may also react with the surface-modifying agent. For example, in some embodiments, a reactive group of the surface-modifying agent may react with, e.g., covalently bond with, the curable resin.

Various embodiments of the compositions of the present disclosure may be used in a wide variety of applications. In some embodiments, the compositions may be applied to a surface of an article. Such coating may be cured, e.g., crosslinked.

In some embodiments, the compositions of the present disclosure may be used to form fibrous composites. For example, in some embodiments, reinforcing fibers may be impregnated with the composition to form a composite article. Composites may be formed using any known means including, e.g., resin transfer molding (®), filament winding, tow placement, resin infusion processes, pultrusion process, or traditional prepreg processes. The resin may then be cured using any known means including exposure to thermal energy and/or actinic radiation.

Generally, any fibers suitable for use in fibrous composites may be used. Exemplary fibers include carbon fibers, glass fibers, ceramic fibers, boron fibers, silicon carbide fibers, polyimide fibers, polyamide fibers, and polyethylene fibers. Combinations of materials may also be used. Generally, the form of the fibers is not particularly limited. Exemplary fiber forms include unidirectional array of individual continuous fibers, woven fabric, knitted fabric, yarn, roving, braided constructions and non-woven mat.

Generally, the compositions of the present disclosure may used in a wide variety of applications including as coatings on, e.g., wind turbine blades and as gel coats on, e.g., vehicles, e.g., boats; and as composites used in the manufacture of, e.g., sporting goods (e.g., rackets, fishing poles, hockey sticks, baseball bats, sailing masts, and the like); wind turbine blades, vehicles and vehicle parts including automobiles, ships, aircraft, and satellites, and space vehicles.

EXAMPLES

TABLE 1

Materials used in the preparation of the examples.

| I.D. | Description | Source |
|---|---|---|
| SOCAL 31 | nanocalcite | Solvay Specialty Chemicals, LTD. |
| VE-1398-5 | HETRON 1398-5 epoxy vinyl ester resin | Ashland Inc. |
| TRIGONOX 121 | peroxide curative | Akzo Nobel |
| PERKADOX 16 | peroxide curative | Akzo Nobel |

Test Methods

Fracture Toughness Procedure. Fracture toughness of cured samples was measured according to ASTM D 5045-99 using a compact tension geometry, wherein the specimens had nominal dimensions of 3.18 cm by 3.05 cm by 0.64 cm (1.25 in. by 1.20 in. by 0.25 in.). The following parameters were employed: W=2.54 cm (1.00 in.) and B=0.64 cm (0.25 in.). Crack length, a, was measured for each sample and was about 1.3 cm in each case. A modified loading rate of 0.13 cm/minute (0.050 inches/minute) was used. Values for fracture toughness, $K_{Ic}$, are reported in units of megaPascals times the square root of meters, i.e., $MPa \cdot m^{1/2}$.

Shear Modulus Procedure. Shear modulus was determined with an RDA-700 Rheometrics Dynamic Analyzer (available from Rheometrics, Inc., Piscataway, N.J.) using a torsion rectangular test mode. Test specimens were machined to 5.08 cm×1.27 cm×0.16 cm. Data were collected at 5° C. intervals from 35° C. to above the glass transition temperature of the resin at a heating rate of 5° C. per minute with a one minute thermal soak before each measurement was taken. The initial strain was 0.45% and the machine was in the strain adjustment mode. The frequency was 10 radians per second.

Calcite Concentration Procedure. A 20 to 50 milligram sample of calcite in resin was placed in a TA Instruments TGA 500 thermogravimetric analyzer. The sample temperature was ramped up in air at 30° C. per minute from 50° C. to 900° C., and then held at 900° C. for 3 minutes. The residual weight was assumed to be the CaO remaining in the sample after volatilizing all organics and carbon dioxide from the calcite. The calcite concentration in the original sample was calculated by dividing the weight percent CaO residue by 0.56.

Calcite Particle Size Procedure. The particle size of the calcite was measured by laser diffraction using a HORIBA LA-950 laser diffraction particle size analyzer, including its accompanying software (available from Horiba Instruments, Inc., Irvine, Calif.). The calcite dispersion was diluted to approximately 1% solids with methyl ethyl ketone. The sample was then added to the measurement cell, which was filled with methyl ethyl ketone, until the transmittance was between the recommended levels of 85% to 95%.

The optical model for the calculation used a refractive index of 1.6000 for calcite and 1.379 for the methyl ethyl ketone solvent, and assumed spherical particles. The second differential method was used for smoothing and was based on 150 iterations. The reported values of percent average particle size less than 400 nm (% less than 400 nm) were based on volume fraction averages and static light scattering.

Binding Energy.

Generally, surface-modifying agents include a compatiblizing group to aide in dispersing the nanoparticles in resin, and a binding group to associate the compatiblizing group with the nanoparticles. The binding energy to calcite of various common and potential binding groups can be determined using density functional theory calculations. Details regarding such calculations are available in Pendrew, J. P.; Burke, K. J.; Ernzerhof, M.; Phys. Rev. Lett. 1996, 3865, 77.

Binding Energy Calculation Procedure. The binding energies of different functional groups to the surface of nanocalcite with periodic boundary condition density functional theory (PBC-DFT) were calculated. In this approach, the surface of the nanoparticle was represented a 2D-periodic slab. The calculations were actually periodic in three dimensions, but a 20 Angstrom layer of vacuum was included to prevent the slabs from interacting with each other in the z-direction. As such, the slab had 2D periodicity. The slabs included three to four layers and were cleaved along a Miller plane. For the case of nanocalcite, the surface was cleaved along the {1014} surface.

Two potential surfaces were modeled, a stoichiometric surface and a calcium rich surface. In the case the calcium rich surface, the under-coordinated calcium ions on the surface were terminated with hydroxyl groups. The isolated molecules were calculated in a periodic box that had an edge length of 11 or 12 Angstroms. The distance was large enough to prevent the molecules from interacting with each other.

The PBE density functional (Perdew, J. P.; Burke, K.; Ernzerhof, M.; Phys. Rev. Lett. 1996, 3865, 77), as implemented in the VASP (Vienna ab-initio simulation package) computer program ((a) Kresse, G.; Hainer, J. Phys. Rev. B 1993, 588, 47; (b) Kresse, G.; Hafner, J. Phys. Rev. B 1994, 251, 49; (c) Kresse, G.; Furthmueller, J. Comput. Mater. Sci. 1996, 15, 6; and (d) Kresse, G.; Furthmueller, J. Phys. Rev. B 1996, 11 169, 54) was used for these calculations. The pseudopotentials used were of the plane-wave augmented wave type and distributed with the VASP computer program. For the case of calcium, the 3p electrons were treated explicitly with the pseudopotential. A plane wave cutoff of 400 eV and 2X2X1 k-point mesh was used for the slab calculations. For the isolated molecules, the pseudopotentials and plane wave cutoffs were identical to those used for the slab calculations, except a 1X1X1 k-point mesh was used.

The binding energies (BE) were calculated in two different ways depending on the surface assumption.

For the stoichiometric surface:

$$BE = E(\text{Slab}) + E(\text{Molecule}) - E(\text{Slab+Molecule}) \quad (1)$$

wherein, E(Slab+Molecule), E(Slab), and E(Molecule) are the electronic energies of the complex, isolated slab, and isolated molecule, respectively. In all cases, the geometries were optimized to their respective minima.

For the calcium rich surface:

$$BE = E(\text{Slab}) + E(\text{Molecule}) + E(\text{Water}) - E(\text{Slab+Molecule}) \quad (2)$$

wherein E(Slab+Molecule), E(Slab), and E(Molecule) are defined above and E(Water) is the electronic energy of an isolated water molecule.

The calculated values in electron volts (e.v.) are summarized in Table 2.

TABLE 2

Calculated binding energy to calcite.

| Binding group | Structure | Binding Energy (e.v.) | |
| --- | --- | --- | --- |
| | | calcium rich surface | stoichiometric surface |
| phosphonic acid | R—P(=O)(OH)—OH | 1.18 | 1.15 |
| sulfonic acid | R—S(=O)(=O)—OH | 0.98 | 1.13 |
| phosphoric acid | R—O—P(=O)(OH)—OH | — | 1.45 |
| phosphinic acid | R—P(=O)(R)—OH | 0.68 | — |

TABLE 2-continued

Calculated binding energy to calcite.

| Binding group | Structure | Binding Energy (e.v.) calcium rich surface | stoichiometric surface |
|---|---|---|---|
| sulfinic acid | R—S(=O)—OH | 0.68 | — |
| carboxylic acid | R—C(=O)—OH | 0.51 | 0.76 |

Based on these modeling results, the following ligands were selected, each comprising a binding group and a compatiblizing segment.

Polyetheramine Sulfonate Ligand. Ligand A was prepared as follows. To 100 g (0.167 mol) of polyetheramine (JEFFAMINE M-600, Mn=600, obtained from Huntsman International, LLC, Salt Lake City, Utah) was added 17.88 g (0.146 mol) of melted propane sultone (purchased from TCI America, Portland, Oreg.). The mixture was heated to 80° C. and stirred for 16 hours. 1H NMR spectra showed complete consumption of the propane sultone. The sulfonic acid ligand was isolated as a red brown liquid and used without further purification. The structure of the sulfonic acid ligand was

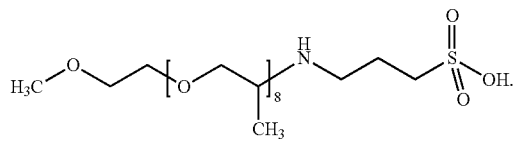

Polyethylene Glycol Phosphonic Acid Ligand. Ligand B was prepared as follows. To 355.8 g (1.017 mol) of poly(ethylene glycol) methyl ether (Mn=350, purchased from Alfa Aesar, Ward Hill, Mass.) at 50° C. was dropwise added 152.8 g (1.284 mol) of thionyl chloride with stirring. Evolved gases were vented through a trap containing 25% aqueous sodium hydroxide. After the addition was complete, the temperature of the reaction mixture was raised to 70° C. After 4 hours, nitrogen was slowly bubbled through the mixture as the temperature was raised to 90° C., and the reaction mixture was held at 90° C. overnight with continued nitrogen bubbling. Remaining volatiles were separated by heating for 2 hours at 120° C. under reduced pressure, leaving 338.7 g of a clear, light amber liquid. The 1H and 13C NMR spectra of the material were consistent with the structure of the desired product, and the crude chloride was used without further purification.

A mixture of 150.0 g (0.430 mol) of the crude chloride prepared above and 214.0 g (1.290 mol) of triethyl phosphite was heated at 170° C. After 3 days, an additional 100.0 g (0.600 mol) of triethyl phosphite was added, and the reaction temperature was increased to 180° C. After an additional 2 days at 180° C., a third portion of 100.0 g (0.600 mol) of triethyl phosphite was added, and heating at 180° C. was continued. After an additional 2 days, 13C NMR analysis of the reaction mixture indicated the absence of the starting chloride at 43 ppm. Diethyl ethylphosphonate and other volatiles were distilled to a final bath temperature of 130° C., by 35-60° C. at 0.05 mm Hg, leaving 187.5 g of a clear, light yellow liquid. The 1H and 13C NMR spectra of the material were consistent with the structure of the desired product, and the crude diethyl phosphonate ester was used without further purification.

To a solution of 90.0 g (0.257 mol) of the crude diethyl phosphonate ester prepared above in 200 mL of dichloromethane was added 98.0 g (0.643 mol) of bromotrimethylsilane. After 18 hours at room temperature, the solution was concentrated under reduced pressure, and the intermediate silylphosphonate ester was dissolved in 250 mL of methanol. The resultant solution was stirred at room temperature for 2 hours. The solution was concentrated under reduced pressure, the concentrate was again dissolved in 250 mL of methanol, and the resultant solution was stirred overnight at room temperature. The mixture was concentrated as before, and after maintaining the concentrate under vacuum overnight to ensure complete separation of solvent, 80.0 g of a clear, light yellow liquid was obtained. The 1H and 13C NMR spectra of the final product were consistent with the structure of the desired phosphonic acid ligand. The 13C NMR spectrum of the product phosphonic acid showed the carbon a to phosphorus as a doublet (JC-P=138.8 Hz) at 27.17 ppm. The structure of the phosphonic acid ligand was

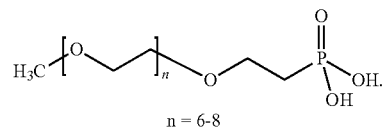

n = 6-8

Acrylic Phosphonate Ligand. Ligand C was prepared as follows. To a slurry of 60.8 g (240 mmol) of 11-bromo-1-undecanol in 80.0 g (950 mmol) of dihydropyran was added 10 drops of POCl$_3$. A moderate exotherm was noted, and the remaining solids dissolved to yield a clear, amber solution. The solution was stirred for 2 hours and poured into 500 mL of saturated aqueous NaHCO$_3$. This mixture was extracted with diethyl ether, and the combined organic phases were washed with saturated aqueous NaCl and dried over MgSO$_4$. Filtration and concentration provided the desired tetrahydropyranyl ether as a clear, amber liquid, which was used without further purification.

A mixture of the tetrahydropyranyl ether and 99.7 g (600 mmol) of triethylphosphite was heated at 135° C. for 16 hours. An additional 50.0 g (300 mmol) of triethylphosphite was added, and heating at 135° C. was continued for an additional 17 hours. Volatiles were distilled from the mixture at 0 1 mm to a bath temperature of 110° C., affording the desired diethylphosphonate ester, which was used without further purification.

To a solution of the diethylphosphonate ester in 200 mL of dichloromethane was added 91.9 g (600 mmol) of bromotrimethylsilane, dropwise over approximately 30 minutes. The mixture was stirred overnight at room temperature and concentrated to a dark liquid. The concentrate was dissolved in 300 mL of methanol, and this solution was stirred overnight at room temperature. Concentration afforded a dark semisolid, which was in turn dissolved in 300 mL of methanol, and this solution was again stirred overnight at room temperature. The solution was concentrated to a dark semisolid, 300 mL of dichloromethane was added, and this mixture was stirred overnight at room temperature. Filtration provided a light tan solid. Recrystallization from an 80:20 mixture of heptane and 2-propanol afforded 32.2 g of 1-phosphono-11-undecanol as light tan crystals, with a melting point of 109-112° C.

A solution of 25.2 g (100 mmol) of 1-phosphono-11-undecanol, 8.6 g (120 mmol) of acrylic acid and 40 mg of 2,6-di-tert-butyl-4-methylphenol in 400 mL of toluene was heated at reflux overnight with provision for azeotropic distillation of water. An additional 5.8 g (80 mmol) of acrylic acid was added, and heating at reflux was continued for an additional 10 hours. The solution was cooled to room temperature, filtered through Celite and concentrated to a soft, tan solid. The solid was triturated in 1 L of hexanes, and filtration provided 27.1 g of 11-phosphonoundececyl acrylate as an off-white solid. The 1H, 13C, and 31P NMR spectra of the final product and all intermediates were consistent with the structures of the target compounds.

DISPERBYK D-111 (Ligand D) is a phosphoric acid polyester ligand, commercially available from BYK-Chemie GmbH.

Calcium carbonate has been used as a filler in resin systems. However, most commercially available fillers have a large average particle size, e.g., 1 to 10 microns. Even commercially available calcium carbonate material based on nanometer-sized primary particle sizes typically contain aggregates of such primary particles leading to an effective particle size significantly greater than the primary particle size. Even with common surface treatments, such aggregated particles may result in highly viscous resin systems at higher particle loadings.

In general, "aggregated" and "aggregates" are descriptive of a strong association of primary particles often bound together by, for example, residual chemical treatment, covalent chemical bonds, or ionic chemical bonds. Further breakdown of the aggregates into smaller entities is very difficult to achieve. Typically, aggregated particles are not broken down into smaller entities by, for example, shearing forces encountered during dispersion of the aggregated particles in a liquid. In contrast, "agglomerated" and agglomerates" are descriptive of a weak association of primary particles usually held together by charge or polarity. Agglomerated particles can typically be broken down into smaller entities by, for example, shearing forces encountered during dispersion of the agglomerated particles in a liquid.

In many applications, including, e.g., the preparation of fibrous composites, the reduction in aggregate size of the as-received nanoparticles can be important to achieving the desired mechanical properties. Generally, common procedures for blending fillers such as calcium carbonate into a resin rely on low shear processes, e.g., air mixing, that are sufficient to provide the desired dispersion, but provide insufficient energy to reduce the aggregate sizes. In contrast, the milling procedures used in the present application provided sufficient energy to reduce the aggregate size and disperse them in the resin.

Vinyl Ester Nanocomposite Preparation Procedure. VE-1398-5 vinyl ester was placed in a four liter stainless steel kettle. To the kettle containing the vinyl ester was added styrene, a reactive diluent. To the vinyl ester and styrene was added a ligand, which was preheated to 90° C. to lower the viscosity for ease of handling. A Cowles mixer was attached to the kettle and the contents mixed. While mixing, SOCAL 31 nanocalcite was gradually added to the kettle. Once fully mixed, the contents were transferred to another four liter kettle attached to a horizontal mill (Netzsch LABSTAR) with 0 5 mm YTZ media used at a 90% loading. The nanocomposite mixture was circulated through the mill using a peristaltic pump at 250 ml/min. In each case, milling was performed until greater than 99% of the calcite particles had an average size of less than 400 nm, as determined according to the Calcite Particle Size Procedure.

Examples EX-1 and EX-2. These examples illustrate the surface modification and compounding of calcite nanoparticles with a resin system containing a reactive diluent using solventless milling. The samples were prepared according to the Vinyl Ester Nanocomposite Preparation Procedure. The compositions and milling conditions are summarized in Table 3.

TABLE 3

Composition of calcite modified with Ligand A and compounded.

| | Amount (g) | | | | Milling | |
|---|---|---|---|---|---|---|
| Ex. | SOCAL 31 nanocalcite | VE-1398-5 resin | styrene | Ligand A | Temp. (° C.) | Time (hrs) |
| EX-1 | 414 | 506 | 92 | 39 | 54 | 4 |
| EX-2 | 5318 | 6500 | 1721 | 532 | 50 | 5 |

Examples EX-3 and EX-4. These examples illustrate the surface modification and compounding of calcite nanoparticles with a resin system containing a reactive diluent using solventless milling. The samples were prepared according to the Vinyl Ester Nanocomposite Preparation Procedure. The compositions and milling conditions are summarized in Table 4.

TABLE 4

Calcite modified with Ligands B and C and compounded.

| | Amount (g) | | | | | Milling | |
|---|---|---|---|---|---|---|---|
| Ex. | SOCAL 31 nanocalcite | VE-1398-5 resin | styrene (g) | Ligand | (g) | Temp. (° C.) | time (hrs) |
| 3 | 300 | 367 | 67 | B | 25 | 50 | 1.2 |
| 4 | 300 | 367 | 134 | C | 25 | 50 | 0.5 |

Example EX-5. This Example illustrates solventless milling with a reactive diluent and a commercially available ligand (Ligand D) to disperse calcite in a vinyl ester resin. A composition containing 857 g of VE-1398-5 vinyl ester, 234 g of styrene, 35 g of Ligand D (DISPERBYK-111, phosphoric acid polyester), and 700 g of SOCAL 31 nanocalcite were compounded according to the Vinyl Ester Nanocomposite Preparation. The composition was milled at 57° C. for three hours. The resulting surface-modified nanoparticles were dispersed in the resin system and greater than 99% of the calcite particles had an average size of less than 400 nm, as determined according to the Calcite Particle Size Procedure.

Cured Resin Properties.

The milled product of Example 1 (270 g) was mixed with two peroxide curatives, i.e., PERKADOX 16 (1.62 g) and TRIGONOX 121 (1.62 g), in a SpeedMixer container. The container was sealed and the contents mixed at 2000 revolutions/minute (rpm) for 30 seconds using a SpeedMixer™ dual asymmetric centrifuge (Model DAC 600 FVZ-sp, available from Flack Tek, Incorporated, Landrum, S.C.). The contents were then poured into 2 glass molds: (a) 8.9 cm×17.8 cm×0.64 cm (3.5 in×7 in×0.25 in) and (b) 22.9 cm×11.4 cm×0.32 cm (9 in×4.5 in×0.125 in). The molds were allowed to sit at room temperature for 15 minutes. Then the molds were moved to a 121° C. (250° F.) oven for 45 minutes. The specimens were then used for measuring the fracture toughness ($K_{Ic}$) according to the Fracture Toughness Procedure and neat resin tensile properties according to the Neat Resin Tensile Procedure. The results are summarized in Table 5.

Comparative Example CE-1. For comparison, a sample was prepared without the surface-modified nanocalcite material. First, 270 g of VE-1398-5 vinyl ester resin was mixed with PERKADOX 16 peroxide curative (2.70 g) and TRIGONOX 121 peroxide curative (2.70 g) in a SpeedMixer container. Next, the container was sealed and the contents mixed at 2000 revolutions/minute (rpm) for 30 seconds using a SpeedMixer™ dual asymmetric centrifuge (Model DAC 600 FVZ-sp, available from Flack Tek, Incorporated, Landrum, S.C.). The contents were then poured into 2 glass molds: (a) 8.9 cm×17.8 cm×0.64 cm (3.5 in×7 in×0.25 in) and (b) 22.9 cm×11.4 cm×0.32 cm (9 in×4.5 in×0.125 in). The molds were allowed to sit at room temperature for 15 minutes. Then the molds were moved to a 121° C. (250° F.) oven for 45 minutes. The specimens were then used for measuring the fracture toughness ($K_{Ic}$ according to the Fracture Toughness Procedure and neat resin tensile properties according to the Neat Resin Tensile Procedure. The results are summarized in Table 5.

TABLE 5

Mechanical properties of cured resin systems.

| Sample | Calcite (wt. %) | Ligand | $K_{Ic}$ (MPa(m$^{1/2}$)) | Modulus (ksi) | Elongation at Break (%) | Stress at yield (MPa) |
| --- | --- | --- | --- | --- | --- | --- |
| Cured CE-1 | none | none | 0.70 | 475 | 4.13 | 81 |
| Cured EX-1 | 42.85% | Ligand A | 1.03 | 757 | 1.97 | 53 |

SOCAL 31 nanocalcite was dispersed into VE-1398-5 vinyl ester using the Vinyl Ester Nanocomposite Preparation Procedure. The ligands used are summarized in Table 6. A comparative example containing no ligand was also prepared. The ligand concentration, also reported in Table 6, was adjusted during the milling process and greater than 99% of the calcite particles in the milled composition had an average size of less than 400 nm, as determined according to the Calcite Particle Size Procedure.

The milled product (270 g) was mixed with PERKADOX 16 peroxide curative (1.62 g) and TRIGONOX 121 peroxide curative (1.62 g) in a SpeedMixer container. The container was sealed and the contents mixed at 2000 revolutions/minute (rpm) for 30 seconds using a SpeedMixer™ dual asymmetric centrifuge (Model DAC 600 FVZ-sp, available from Flack Tek, Incorporated, Landrum, S.C.). The contents were then poured into 2 glass molds: (a) 8.9 cm×17.8 cm×0.64 cm (3.5 in×7 in×0.25 in) and (b) 22.9 cm×11.4 cm×0.32 cm (9 in×4.5 in×0.125 in). The molds were allowed to sit at room temperature for 15 minutes. Then the molds were moved to a 121° C. (250° F.) oven for 45 minutes. The specimens were then used for measure the fracture toughness ($K_{Ic}$) according to the Fracture Toughness Procedure and the shear modulus according to the Shear Modulus Procedure. The results are summarized in Table 6.

TABLE 6

Calcite dispersed in a vinyl ester resin with various ligands.

| Ex | Calcite (wt. %) | Ligand (wt. %) | K1c (MPa(m$^{1/2}$)) | Shear Modulus (GPa) |
| --- | --- | --- | --- | --- |
| CE-2 | 0 | none | 0.56 | 1.58 |
| EX-6 | 43 | 10% Ligand A | 0.79 | 2.35 |

TABLE 6-continued

Calcite dispersed in a vinyl ester resin with various ligands.

| Ex | Calcite (wt. %) | Ligand (wt. %) | K1c (MPa(m$^{1/2}$)) | Shear Modulus (GPa) |
| --- | --- | --- | --- | --- |
| EX-7 | 44 | 8% Ligand B | 1.95 | 2.08 |
| EX-8 | 43 | 5% Ligand D | 0.79 | 2.81 |

Various modifications and alterations of this invention will become apparent to those skilled in the art without departing from the scope and spirit of this invention.

What is claimed is:

1. A composition comprising surface-modified nanoparticles comprising a calcite core dispersed in a curable resin system comprising a vinyl ester resin, wherein the surface-modified nanoparticles comprise a first surface-modifying agent comprising a compatiblizing group and a binding group ionically associated with the calcite, wherein the binding group comprises a phosphonic acid, a sulfonic acid, a phosphoric acid, or a combination thereof; and wherein the compatiblizing group comprises a polyetheramine.

2. The composition of claim 1, wherein the difference between the solubility parameter of the curable resin and the solubility parameter of the compatiblizing group, as determined according to the Solubility Parameter Procedure, is no more than 4 $J^{1/2}$ cm$^{-3/2}$.

3. The composition according to claim 1, wherein the binding group has a binding energy of at least 0.50 electron volts to calcite as calculated using the Binding Energy Calculation Procedure assuming a calcite rich surface.

4. The composition according to claim 1, wherein at least 90%, of the calcite cores have an average size of less than 400 nm as measured by the Calcite Particle Size Procedure.

5. The composition according to claim 1, wherein the curable resin system further comprises a reactive diluent.

6. The composition according to claim 1, wherein the polyetheramine comprises at least one of a polyethylene oxide and a polypropylene oxide.

7. The composition according to claim 1, wherein the first surface-modifying agent is a zwitterion.

8. The composition according to claim 5, wherein the first surface-modifying agent further comprises a reactive group capable of reacting with at least one of the vinyl ester resin and the reactive diluent.

9. The composition according to claim 5, further comprising a second surface-modifying agent bonded to the calcite, wherein the second surface-modifying agent comprises a binding group and a reactive group capable of reacting with at least one of the vinyl ester resin and the reactive diluent.

10. The composition according to claim 1, wherein the composition comprises at least 10 wt. % nanoparticles based on the total weight of the nanoparticles and the curable resin system.

11. The composition according to claim 1, wherein the composition comprises no greater than 2 wt. %, solvent.

12. A cured composition comprising the composition according to claim 1, wherein the vinyl ester resin is cured.

13. The cured composition of claim 12, wherein the first surface-modifying agent is reacted with the vinyl ester resin.

14. A coated article comprising a substrate and the cured composition of claim 12 bonded to at least a portion of the substrate.

15. A fibrous composite comprising the composition according to claim 1 and reinforcing fibers, wherein the reinforcing fibers are impregnated with the composition.

16. The fibrous composite of claim 15, wherein the vinyl ester resin is cured.

17. The composition according to claim 1, wherein the first surface-modifying agent further comprises a reactive group capable of reacting with the vinyl ester resin.

18. The composition according to claim 1, further comprising a second surface-modifying agent bonded to the calcite, wherein the second surface-modifying agent comprises a binding group and a reactive group capable of reacting with the vinyl ester resin.

19. The composition according to claim 1, wherein the composition comprises no greater than 5 wt. %, solvent.

20. The composition according to claim 1, wherein the composition comprises no greater than 1 wt. %, solvent.

* * * * *

UNITED STATES PATENT AND TRADEMARK OFFICE
CERTIFICATE OF CORRECTION

PATENT NO. : 10,023,726 B2
APPLICATION NO. : 13/502891
DATED : July 17, 2018
INVENTOR(S) : William Schultz et al.

Page 1 of 1

It is certified that error appears in the above-identified patent and that said Letters Patent is hereby corrected as shown below:

In the Specification

<u>Column 8</u>
Line 6, delete "Hainer," and insert -- Hafner, --, therefor.

Signed and Sealed this
Twenty-sixth Day of February, 2019

Andrei Iancu
*Director of the United States Patent and Trademark Office*

UNITED STATES PATENT AND TRADEMARK OFFICE
CERTIFICATE OF CORRECTION

PATENT NO. : 10,023,726 B2
APPLICATION NO. : 13/502891
DATED : July 17, 2018
INVENTOR(S) : William Schultz et al.

It is certified that error appears in the above-identified patent and that said Letters Patent is hereby corrected as shown below:

On the Title Page

<u>In Column 1, under (Prior Publication Data)</u>
After the line "US 2012/0244338 A1 Sep. 27, 2012", insert the following language:
-- (60) Related U.S. Application Data
Provisional Application No. 61/287,531, filed on Dec. 17, 2009. --

Signed and Sealed this
Twenty-first Day of July, 2020

Andrei Iancu
*Director of the United States Patent and Trademark Office*